United States Patent
Hwang et al.

(10) Patent No.: US 9,319,919 B2
(45) Date of Patent: Apr. 19, 2016

(54) METHOD AND TERMINAL FOR MEASURING INTERFERENCE IN HETEROGENEOUS NETWORK HAVING CO-EXISTING MACRO CELL AND SMALL-SCALE CELL

(71) Applicant: LG ELECTRONICS INC., Seoul (KR)

(72) Inventors: Jinyup Hwang, Seoul (KR); Sangwook Lee, Seoul (KR); Manyoung Jung, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/421,763

(22) PCT Filed: Aug. 20, 2013

(86) PCT No.: PCT/KR2013/007457
§ 371 (c)(1),
(2) Date: Feb. 13, 2015

(87) PCT Pub. No.: WO2014/038801
PCT Pub. Date: Mar. 13, 2014

(65) Prior Publication Data
US 2015/0237517 A1 Aug. 20, 2015

Related U.S. Application Data

(60) Provisional application No. 61/697,315, filed on Sep. 6, 2012.

(51) Int. Cl.
*H04W 24/10* (2009.01)
*H04L 1/06* (2006.01)
*H04W 88/02* (2009.01)

(52) U.S. Cl.
CPC ............ *H04W 24/10* (2013.01); *H04L 1/0693* (2013.01); *H04W 88/02* (2013.01)

(58) Field of Classification Search
None
See application file for complete search history.

(56) References Cited

U.S. PATENT DOCUMENTS

| | | |
|---|---|---|
| 2010/0151876 A1 | 6/2010 | Park et al. |
| 2012/0040707 A1 | 2/2012 | Kim et al. |
| 2013/0090142 A1 | 4/2013 | Lee et al. |

(Continued)

FOREIGN PATENT DOCUMENTS

| | | |
|---|---|---|
| KR | 10-2010-0068162 A | 6/2010 |
| WO | WO 2012/023734 A2 | 2/2012 |

(Continued)

OTHER PUBLICATIONS

Etri, "Discussion on OAM coordination for Macro-Femto Enhanced ICIC", 3GPP TSG-RAN WG3 Meeting #70, R3-103212, Jacksonville (FL), USA, Nov. 15-19, 2010, pp. 1-2.

*Primary Examiner* — Christine Duong
(74) *Attorney, Agent, or Firm* — Birch, Stewart, Kolasch & Birch, LLP

(57) ABSTRACT

The present invention relates to a method by which a terminal measures interference in a wireless communication system in which a macro cell and a small-scale cell coexist. The interference measurement method can include a step in which a terminal receives setting information for interference measurement (IM). Here, the setting information for the IM includes at least two settings, each setting is defined in a resource element (RE) unit, the first of the two settings is for measuring interference from other neighboring cells besides the macro and small-scale cells, and the second is for measuring interference from the macro cell. The interference measurement method may further include: measuring interference by using setting information for the IM; and feeding back channel quality obtained by using the measured interference value.

9 Claims, 19 Drawing Sheets

(56) References Cited

U.S. PATENT DOCUMENTS

2013/0196675 A1* 8/2013 Xiao .................. H04W 72/082
 455/452.1
2013/0301450 A1* 11/2013 Geirhofer .............. H04B 7/024
 370/252

FOREIGN PATENT DOCUMENTS

WO　　WO 2012/096521　A2　　7/2012
WO　　WO 2012/099369　A2　　7/2012

* cited by examiner

METHOD AND TERMINAL FOR MEASURING INTERFERENCE IN HETEROGENEOUS NETWORK HAVING CO-EXISTING MACRO CELL AND SMALL-SCALE CELL

CROSS REFERENCE TO RELATED APPLICATIONS

This application is the National Phase of PCT/KR2013/007457 filed on Aug. 20, 2013, which claims priority under 35 U.S.C. 119(e) to U.S. Provisional Application No. 61/697,315 filed on Sep. 6, 2012, all of which are incorporated by reference herein in its entirety.

BACKGROUND OF THE INVENTION

1. Field of the Invention

The present invention relates to a heterogeneous network in which a macro cell and a small-scale cell co-exist, and more particularly, to a method and terminal for measuring an interference.

2. Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

In addition, recently, there is ongoing discussion on a heterogeneous network in which a macro cell and a small-scale cell co-exist. In particular, there is an ongoing discussion for traffic offloading by distributing terminals having access to the macro cell to the small-scale cell.

When the macro cell and the small-scale cell transmit a channel state information (CSI)-reference signal (RS) in a coordinated manner in such a heterogeneous network, a terminal must feed back a channel quality indicator (CQI) both in a normal subframe and an almost blank subframe (ABS). The CQI may be calculated through an interference measurement. The interference measurement must be performed in both of the ABS subframe and the normal subframe. However, there is a case where the interference is not measured on the ABS subframe according to a situation.

SUMMARY OF THE INVENTION

Accordingly, one aspect of the present application aims to provide a method capable of measuring an interference on a normal subframe and an almost blank subframe (ABS) subframe in an environment where a macro cell and a small-scale cell co-exist.

In order to achieve the aforementioned purpose, one aspect of the present application provides a method for measuring an interference in a wireless communication system in which a macro cell and a small-scale cell co-exist. The method may be performed by a terminal and comprise: receiving, by the terminal, configuration information regarding an interference measurement (IM), wherein the configuration information regarding the IM contains at least two configurations, each configuration is defined in unit of a resource element (RE), a first configuration of the two configurations is for measuring an interference from other neighboring cells besides the macro cell and the small-scale cell, and a second configuration is for measuring an inference from the macro cell; measuring the inference by using the configuration information regarding the IM; and feeding back channel quality attained by using the measured interference value.

The first configuration may be defined not to be overlapped with an RE of a channel state information reference signal (CSI-RS) of the macro cell and the small-scale cell. And, the second configuration may be defined to be overlapped with an RE of a CRI-RS of the macro cell.

The first configuration may be for attaining the same result as the IM performed on a subframe operated as an almost blank subframe (ABS), and the second configuration may be for attaining the same result as the IM performed on a normal subframe not operated as the ABS.

The receiving of the configuration information may comprise: receiving first configuration information regarding the IM from the macro cell; and receiving second configuration information regarding the IM from the small-scale cell.

The first configuration in the first configuration information from the macro cell and the first configuration in the second configuration information from the small-scale cell may overlap with each other in terms of the RE. Also, the second configuration in the first configuration information from the macro cell and the second configuration in the second configuration information from the small-scale cell may be different from each other in terms of the RE.

Meanwhile, to achieve the aforementioned purpose, one aspect of the present application provides a terminal for measuring an interference in a wireless communication system in which a macro cell and a small-scale cell co-exist. The terminal may comprise: a radio frequency (RF) unit for receiving, by the terminal, configuration information regarding an interference measurement (IM), wherein the configuration information regarding the IM contains at least two configurations, each configuration is defined in unit of a resource element (RE), a first configuration of the two configurations is for measuring an interference from other neighboring cells besides the macro cell and the small-scale cell, and a second configuration is for measuring an inference from the macro cell; and a processor for measuring the inference by using the configuration information regarding the IM, and for feeding back channel quality attained by using the measured interference value.

According to an aspect of the present application, a channel quality indicator (CQI) can be calculated more accurately by using an interference measurement.

DESCRIPTION OF EXEMPLARY EMBODIMENTS

Figure 1:
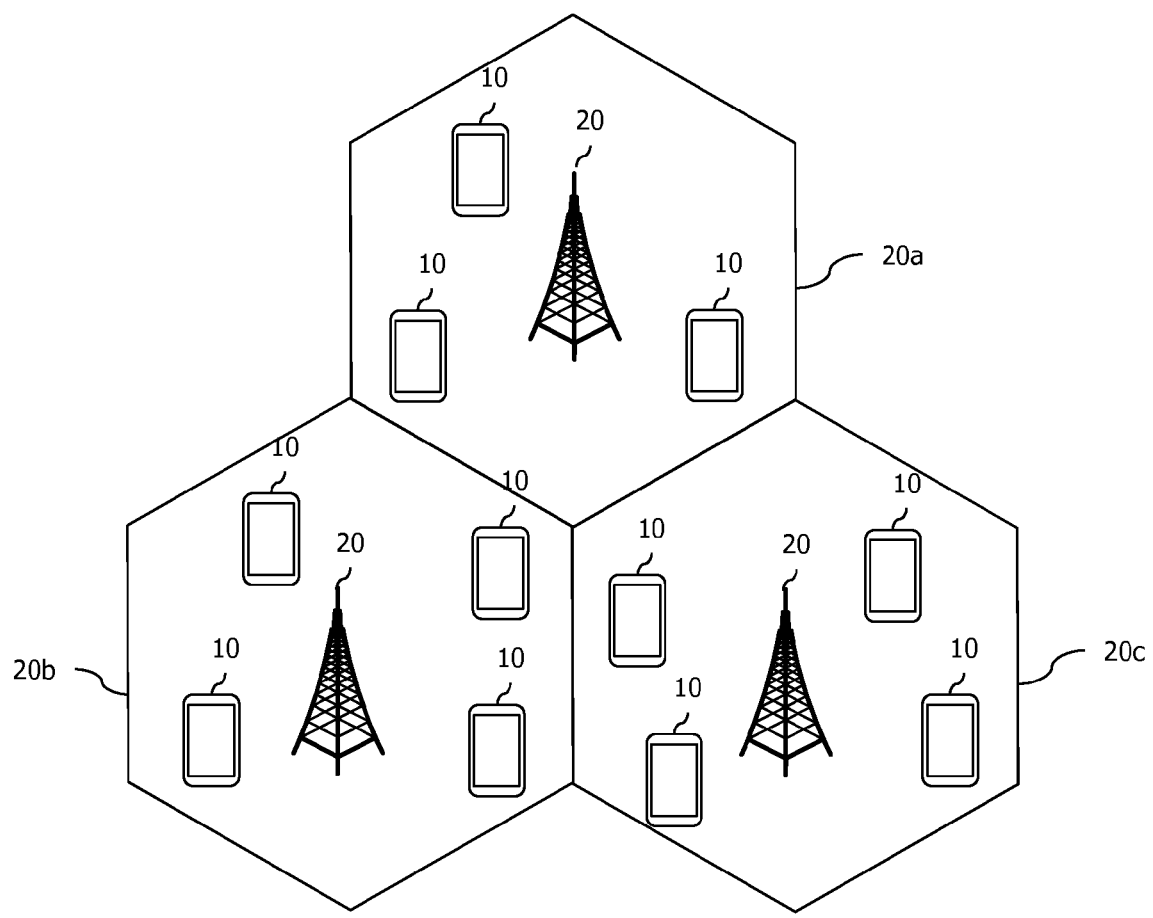
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 Shows a Wireless Communication System.

The wireless communication system 10 includes at least one base station (BS) 20. Respective BSs 20 provide a communication service to particular geographical areas 20*a*, 20*b*, and 20*c* (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
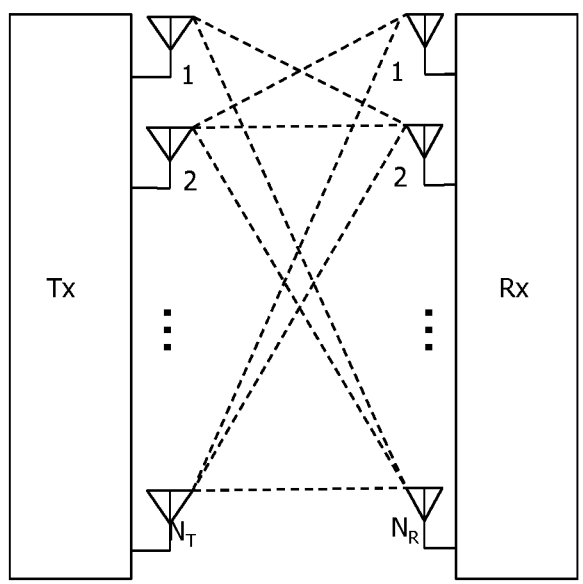
FIG. 2 illustrates a general multiple antenna system.

FIG. 2 Illustrates a General Multiple Antenna System.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below. That is, for example, in the MIMO communication system that uses 4 transmission antennas and 4 reception antennas, the transmission rate may be increased 4 times in comparison with the single antenna system theoretically.

After the theoretical increase of capacity in such a multiple antenna system is proved in the middle of 1990', various technologies to induce the theoretical increase into actual increase of data transmission rate has been researched up to now, and a few of the technologies are already applied to various wireless communication standards such as third generation mobile communication and next generation wireless LAN, etc.

$$R_i = \min(N_T, N_R) \quad \text{[Equation 1]}$$

The research trends in relation to the multiple antenna up to now show that researches have been vigorously progressed in various aspects such as a research in the aspect of information theory in relation to communication capacity calculation of multiple antenna in various channel environment and multiple access environment, researches of wireless channel measurement and modeling process of the multiple antenna system, and a research of space-time signal processing for increasing transmission reliability and transmission rate, etc.

In a user equipment structure having general MIMO channel environment, reception signals received in each reception antenna can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 2]}$$

$$Hx + n$$

Herein, the channel between respective transmission and reception antennas may be distinguished based on transmission and reception index, and the channel passing from a transmission antenna j to a reception antenna i is represented as $h_{ij}$. In case of using precoding scheme like LTE when transmitting a signal, the transmission signal x can be expressed by Equation 3.

$$x = \quad \text{[Equation 3]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Herein, $w_{ij}$, a precoding matrix w means a weighting between a ith transmission antenna and jth information. In this time, if the transmission power of a respective signal to be transmitted is $P_1, P_2, \ldots, P_{N_T}$, a transmission information of which transmission power has been adjusted may be represented as a diagonal matrix P as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 3:
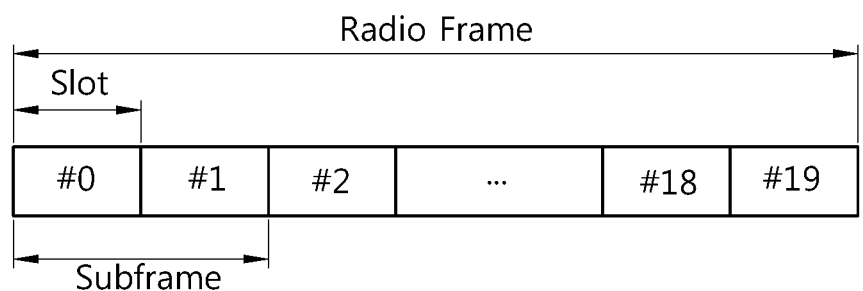
FIG. 3 illustrates the architecture of a radio frame according to frequency division duplex (FDD) in 3rd generation partnership project (3GPP) long term evolution (LTE).

FIG. 3 Illustrates the Architecture of a Radio Frame According to FDD in 3GPP LTE.

Referring to FIG. 3, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 4:
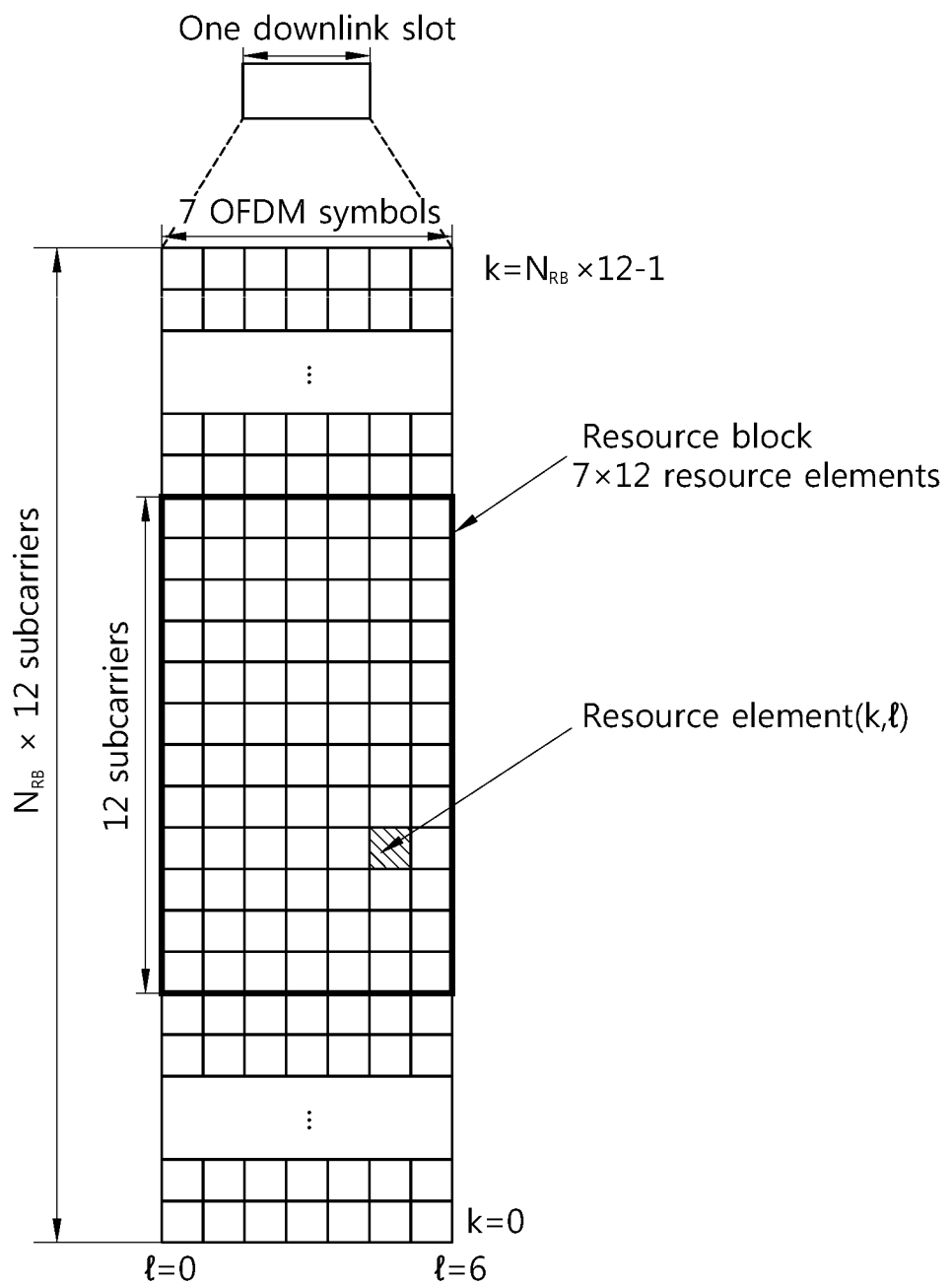
FIG. 4 illustrates an example resource grid for one uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and $N^{UL}$ resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 5:
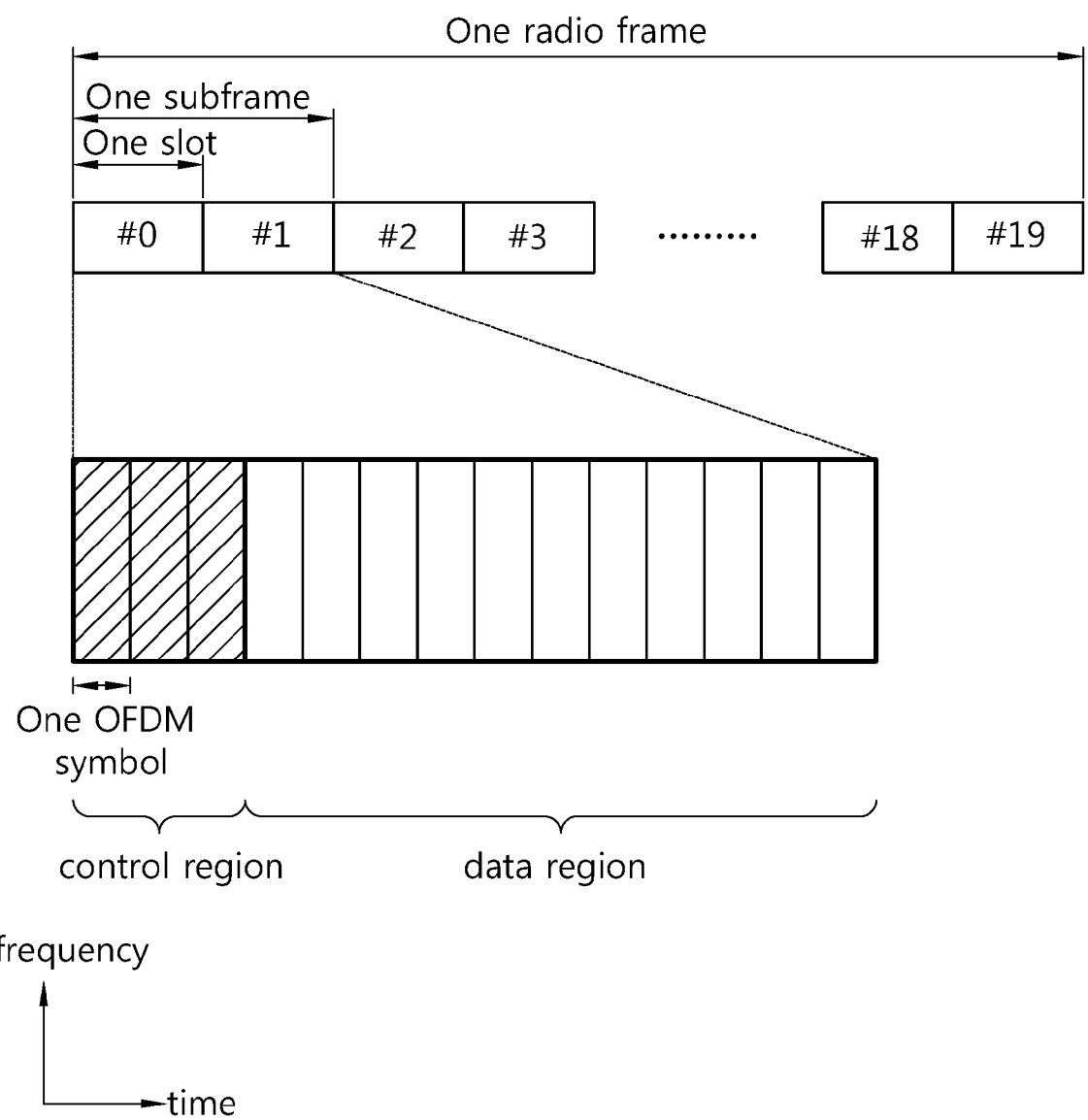
FIG. 5 illustrates the architecture of a downlink sub-frame.

FIG. 5 Illustrates the Architecture of a Downlink Sub-Frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
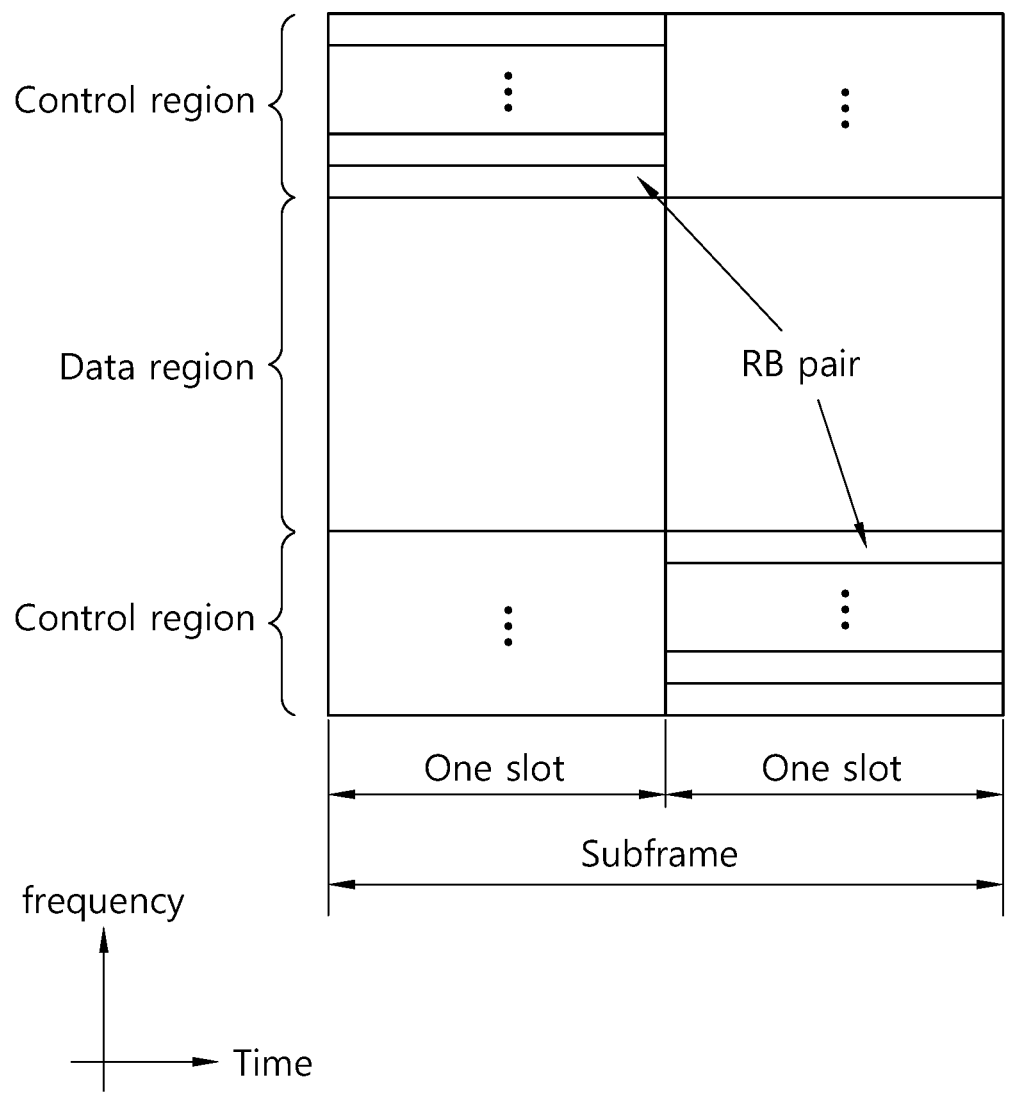
FIG. 6 illustrates the architecture of an uplink sub-frame in 3GPP LTE.

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 7:
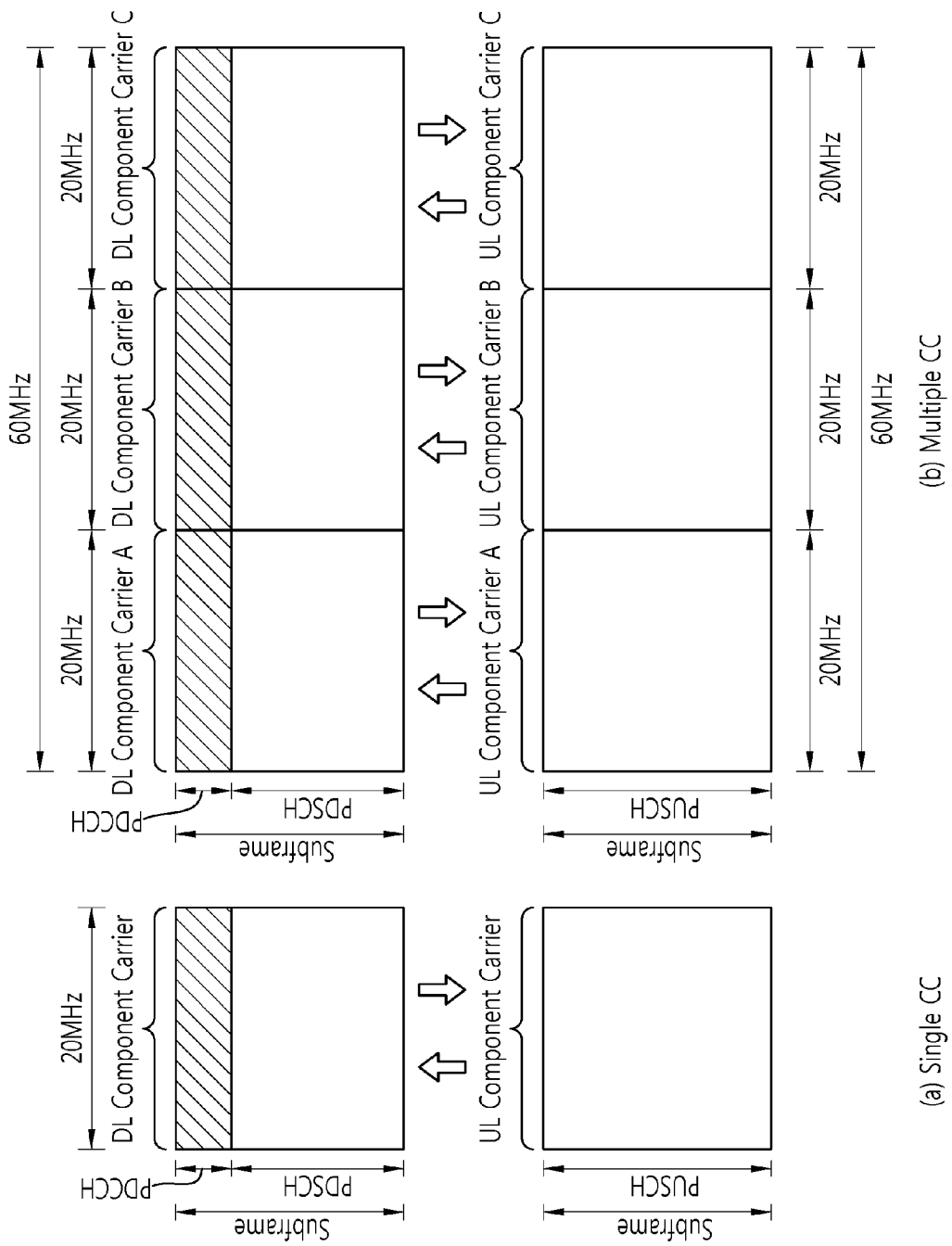
FIG. 7 illustrates an example of comparison between a single carrier system and a carrier aggregation system.

FIG. 7 Illustrates an Example of Comparison Between a Single Carrier System and a Carrier Aggregation System.

Referring to FIG. 7(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 7(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 7(b) may correspond to a communication example in an LTE-A system.

Referring to FIG. 7(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 7(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz (UL CC1)+20 MHz(UL CC2)+20 MHz(UL CC3)+5 MHz (UL CC4), for example. However, without consideration of backward compatibility, a new bandwidth may be defined rather the existing system bandwidth being used, to constitute a broadband.

FIG. 7(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Figure 8:
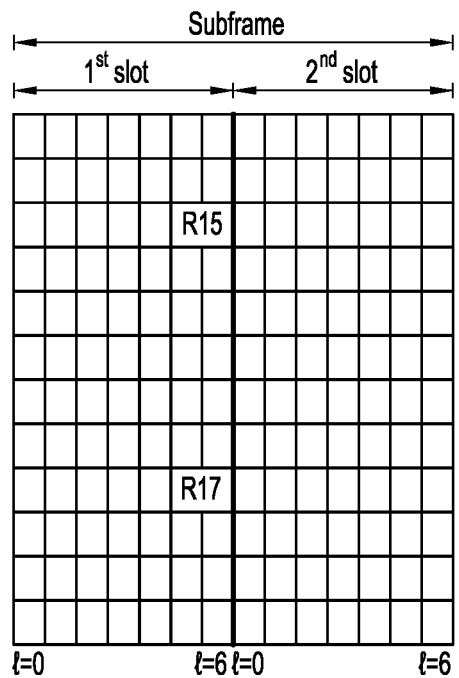
FIG. 8 illustrates an example of a resource block (RB) to which a channel state information (CSI)-reference signal (RS) is mapped among reference signals.
Figure 8:
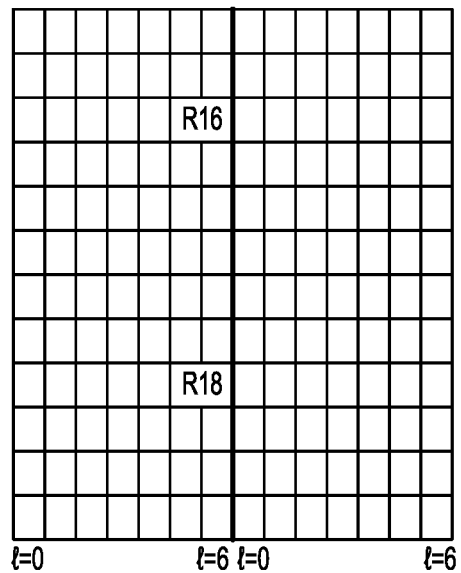
Figure 8:
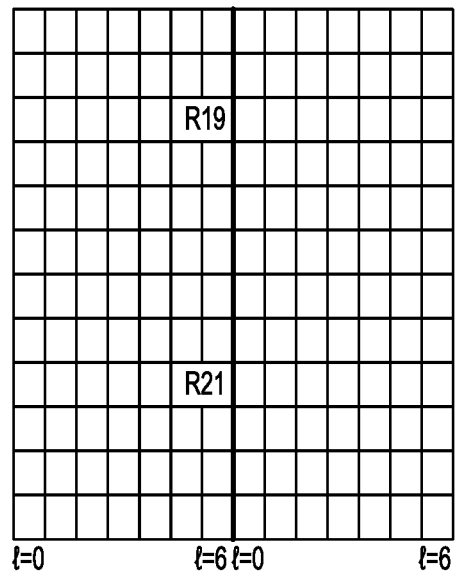
Figure 8:
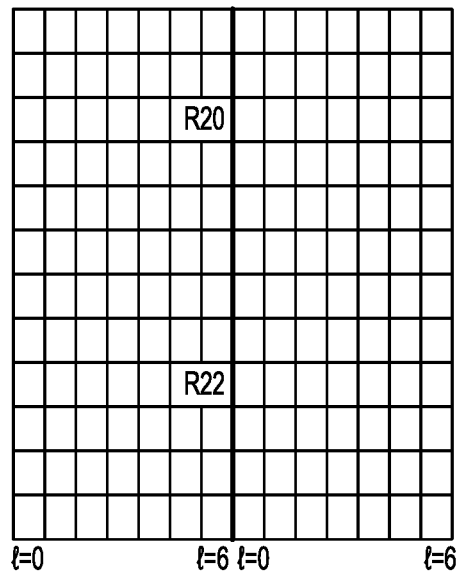

FIG. 8 Illustrates an Example of an RB to which a CSI (Channel State Information)-RS (Reference Signal) is Mapped Among Reference Signals.

Before a CSI-RS of FIG. 8 is described, an RS will be described first.

A downlink reference signal may include a cell-specific reference signal (CRS), a multimedia broadcast and multicast single frequency network (MBSFN) reference signal, a UE-specific reference signal, a positioning reference signal (PRS), a channel state information reference signal (CSI-RS), and the like. The CRS is a reference signal that is transmitted to all UEs within a cell. The CRS may be used to perform channel measurement for channel quality indicator (CQI) feedback and channel estimation for a PDSCH. The MBSFN reference signal may be transmitted in a subframe allocated for MBSFN transmission. The UE-specific reference signal is a reference signal received by a specific UE (or a specific UE group) in a cell, and is mainly used by the specific UE or the specific UE group to perform data demodulation. The PRS may be used to estimate the position of the UE.

The CSI-RS is used to perform channel estimation for a PDSCH for an LTE-A UE and channel measurement for channel information generation. The CSI-RS is relatively sparse in a frequency domain or a time domain. The CSI-RS may be punctured in a data region of a normal subframe or an MBSFN subframe. If necessary for estimation of the CSI, CQI, PMI, RI, or the like may be reported from the UE.

The CSI-RS is transmitted on 1, 2, 4, or 8 antenna ports. The antenna ports used are p=15, p=15,16, p=15, . . . , 18 and p=15, . . . , 22, respectively. The CSI-RS is defined for a subcarrier interval of Δf=15 kHz only. For the CSI-RS, reference can be made to Paragraph 6.10.5 of 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)".

For CSI-RS transmission, 32 different configurations may be proposed in order to decrease inter-cell interference (ICI) in a multi-cell environment including a heterogeneous network environment. The configuration for the CSI-RS differs depending on the number of antenna ports in a cell, and neighboring cells may have as much different CSI-RS configurations as possible. Moreover, the CSI-RS configurations may be divided into ones applied to both an FDD frame and a TDD frame and ones applied only to a TDD frame according to a frame structure. A plurality of CSI-RS configurations can be used in a given cell. Zero or one configuration in which the UE assumes non-zero power for the CSI-RS may be used, and zero or more configurations in which the UE assumes zero power for the CSI-RS may be used.

A CSI-RS configuration may be signaled by a higher layer. For example, a CSI0RS configuration may be signaled by a CSI-RS_Config IE (information element) transmitted through a higher layer. Table 1 shows an example of a CSI-RS-Config IE.

TABLE 1

```
--ASN1START
CSI-RS-Config-r10 ::=      SEQUENCE {
        csi-RS-r10                CHOICE {
            release                     NULL,
            setup                       SEQUENCE {
                antennaPortsCount-r10           ENUMERATED {an1, an2, an4, an8},
                resourceConfig-r10              INTEGER (0..31),
                subframeConfig-r10              INTEGER (0..154),
                p-C-r10                         INTEGER (-8..15)
            }
        }                                                   OPTIONAL,                    --Need ON
        zeroTxPowerCSI-RS-r10     CHOICE {
            release                     NULL,
            setup                       SEQUENCE {
                zeroTxPowerResourceConfigList-r10   BIT STRING (SIZE (16)),
                zeroTxPowerSubframeConfig-r10       INTEGER (0..154)
            }
        }                                                   OPTIONAL                     --Need ON
}
--ASN1STOP
```

Referring to Table 1, the 'antennaPortsCount' field indicates the number of antennas used for CSI-RS transmission. The 'resourceConfig' field indicates a CSI-RS configuration. The 'SubframeConfig' field and the 'zeroTxPowerSubframeConfig' field indicate the configuration of a subframe in which a CSI-RS is transmitted.

The 'zeroTxPowerSubframeConfig' field indicates the configuration of a zero-power CSI-RS. A CSI-RS configuration corresponding to a bit set to 1 in a bitmap of 16 bits of the 'zeroTxPowerSubframeConfig' field may be set to the zero power CSI-RS.

A sequence $r_{l,n_s}(m)$ for the CSI-RS is generated by the following Equation:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 5]}$$

$$m = 0, \ldots, N_{RB}^{max,DL} - 1$$

where, $$c_{init} =$$

$$2^{10} \cdot (7 \cdot (n_s + 1) + l + 1) \cdot (2 \cdot N_{ID}^{cell} + 1) + 2 \cdot N_{ID}^{cell} + N_{CP}$$

-continued $$N_{CP} = \begin{cases} 1 & \text{for normal } CP \\ 0 & \text{for extended } CP \end{cases}$$

where $n_s$ is a slot number in a radio frame, and l denotes an OFDM symbol number in a slot. c(i) denotes a pseudo random sequence, and starts with $c_{init}$ in each OFDM symbol. $N_{ID}^{cell}$ denotes a physical layer cell ID.

In subframes configured to transmit the CSI-RS, the RS sequence $r_{1,ns}(m)$ is mapped to a complex-valued modulation symbol $a_{k,1}^{(p)}$ used as a reference symbol for the antenna port p.

The relationship between $r_{1,ns}(m)$ and $a_{k,1}^{(P)}$ is as shown in the following Equation:

$$a_{k,l}^{(p)} = w_{l''} \cdot r(m) \quad \text{[Equation 6]}$$

where, $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l'} = \begin{cases} 1 & p \in \{15, 17, 19, 21\} \\ (-1)^{l'} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where (k', l') and $n_s$ are given in Table 2 and Table 3 below. The CSI-RS can be transmitted in a downlink slot satisfying the conditions ($n_s$ mod2) of Table 2 and Table 3 below (herein, 'mod' denotes a modular operation, that is, ($n_s$ mod2) denotes a remainder obtained by dividing ns by 2).

Table 2 shows a CSI-RS configuration in case of a normal CP, and Table 3 shows a CSI-RS configuration in case of an extended CP.

TABLE 2

| CSI-RS configuration index | Number of CSI-RS configured | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| TDD and FDD 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |

TABLE 2-continued

| CSI-RS configuration index | Number of CSI-RS configured | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| frame 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |

TABLE 2-continued

| CSI-RS configuration index | Number of CSI-RS configured | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| TDD frame 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |

TABLE 2-continued

| CSI-RS configuration index | Number of CSI-RS configured | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 3

| | CSI-RS configuration index | Number of CSI-RS configured | | | | | |
|---|---|---|---|---|---|---|---|
| | | 1 or 2 | | 4 | | 8 | |
| | | (k', l') | ns mod 2 | (k', l') | ns mod 2 | (k', l') | ns mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE can transmit the CSI-RS in a downlink slot satisfying the conditions of $n_s$ mod2 in Tables 2 and 3. The UE does not transmit the CSI-RS in the following cases: a special subframe of a TDD frame; a subframe in which a CSI-RS transmission collides with a synchronization signal, a PBCH (physical broadcast channel), and a system information block type 1 (SystemINformationBLockType1); and a subframe in which a paging message is transmitted. In addition, a resource element used to transmit an CSI-RS for any one antenna port is not used to transmit a PDSCH or a CSI-RS for any other antenna ports included in the set S in which S={15, 16}, S={17, 18}, S={19, 20}, or S={21, 22}.

Table 4 shows an example of a subframe configuration for a CSI-RS transmission.

TABLE 4

| CSI-RS-SubframeConfig $I_{CSI-RS}$ | CSI-RS period $T_{CSI-RS}$ (Subframe) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 4, a period $T_{CSI-RS}$ and offset $\Delta_{CSI-RS}$ of a subframe in which a CSI-RS is transmitted may be determined according to a CSI-RS subframe configuration $I_{CSI-RS}$. The CSI-RS subframe configuration of Table 4 may be any one of a 'SubframeConfig' field and 'ZeroTxPowerSubframeConfig' field of the CSI-RS-Config IE of Table 1. The CSI-RS subframe configuration may be configured separately as to a non-zero power CSI-RS and a zero power CSI-RS.

Meanwhile, FIG. 8 illustrates REs used for a CSI-RS when a CSI-RS configuration index is 0 in a normal CP structure. Rp denotes an RE used in CSI-RS transmission on an antenna port p. Referring to FIG. 8, a CSI-RS for antenna ports 15 and 16 is transmitted on an RE corresponding to a $3^{rd}$ subcarrier (i.e., a subcarrier index 2) of $6^{th}$ and $7^{th}$ OFDM symbols (i.e., OFDM symbol indices 5 and 6) of a $1^{st}$ slot. A CSI-RS for antenna ports 17 and 18 is transmitted on an RE corresponding to a $9^{th}$ subcarrier (i.e., a subcarrier index 8) of the $6^{th}$ and $7^{th}$ OFDM symbols (i.e., OFDM symbol indices 5 and 6) of the $1^{st}$ slot. A CSI-RS for antenna ports 19 and 20 is transmitted on the same RE for transmitting the CSI-RS for the antenna ports 15 and 16. A CSI-RS for antenna ports 21 and 22 is transmitted on the same RE for transmitting the CSI-RS for the antenna ports 17 and 18.

If the CSI-RS is transmitted to the UE through 8 antenna ports, the UE receives an RB to which R15 to R22 are mapped. That is, a CSI-RS having a specific pattern is received.

Figure 9:
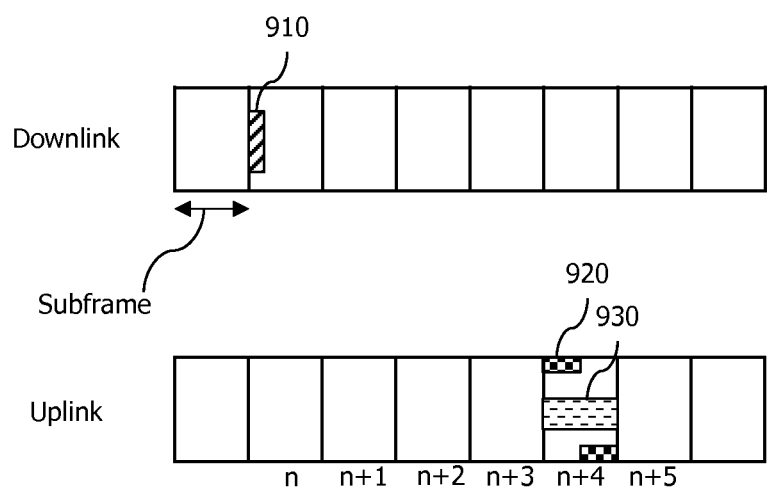
FIG. 9 illustrates an example of a physical downlink control channel (PDCCH), a physical uplink control channel (PUCCH), and a physical uplink shared channel (PUSCH).

FIG. 9 Illustrates an Example of a PDCCH, a PUCCH, and a PUSCH.

As can be seen with reference to FIG. 9, a UE receives a PDCCH 910 in a subframe n.

Further, the UE may transmit a PUCCH 920, for example, in a subframe n+4 or may transmit a PUSCH 930 or may simultaneously transmit the PUCCH 920 and the PUSCH 930.

UCI (uplink control information) may be transmitted on the PUCCH 920. In this case, the PUCCH carries various types of control information according to a format. The UCI includes HARQ ACK/NACK, SR (scheduling request), and channel status information (CSI) indicating a downlink channel status.

The CSI is an indicator for indicating a state of a downlink (DL) channel, and may include at least any one of a CQI (channel quality indicator) and a PMI (precoding matrix indicator). A PTI (precoding type indicator), an RI (rank indication) etc., may be further included.

The CQI provides information on a link adaptive parameter that can be supported by a UE for a given time. The CQI may indicate a data rate which can be supported by a downlink channel by considering a characteristic of a UE receiver, a signal to interference plus noise ratio (SINR), etc. A BS may determine a modulation (QPSK, 16-QAM, 64-QAM, etc.) and coding rate to be applied to the downlink channel by using the CQI. The CQI may be generated by using various methods. For example, there is a method of directly quantizing and feeding back a channel state, a method of calculating and feeding back an SINR, a method of reporting a state actually applied to the channel such as an MCS (modulation coding scheme). If the CQI is generated on the basis of the MCS, the MCS includes a modulation scheme, a coding scheme, and a coding rate or the like based thereon.

The PMI provides information for a precoding matrix in codebook-based precoding. The PMI is in association with multiple input multiple output (MIMO). When the PMI is fed back in MIMO, it is called closed-loop MIMO.

The RI is information for the number of layers recommended by the UE. That is, the RI indicates the number of streams used in spatial multiplexing. The RI is fed back only when it operates in a MIMO mode in which the UE uses spatial multiplexing. The RI is also in association with one or more CQI feedbacks. That is, a specific RI value is assumed in calculation of the CQI to be fed back. A rank of a channel changes slowly in general in comparison with the CQI, and thus the RI is fed back in a less number of times than the CQI. An RI transmission periodicity may be a multiple of a CQI/PMI transmission periodicity. The RI is given for a full system band, and a frequency selective RI feedback is not supported.

As described above, the PUCCH is used only for UCI transmission. For this, the PUCCH supports multiple formats. A PUCCH having a different number of bits per subframe may be used according to a modulation scheme which is dependent on the PUCCH format.

Meanwhile, the PUSCH 930 is allocated by a UL grant on the PDCCH 910. The PUSCH 930 is mapped to a UL-SCH (uplink shared channel) which is a transport channel. Uplink data transmitted through the PUSCH 930 may be a transport block which is a data block for the UL-SCH transmitted during a TTI. The transport block may include user data. In addition, the uplink data may be multiplexed data. The multiplexed data may be obtained by multiplexing a CSI and a transport block for the UL-SCH. Examples of the CSI multiplexed to the data may include a CQI, a PMI, an RI, etc. Alternatively, the uplink data may consist of only the CSI.

Figure 10:
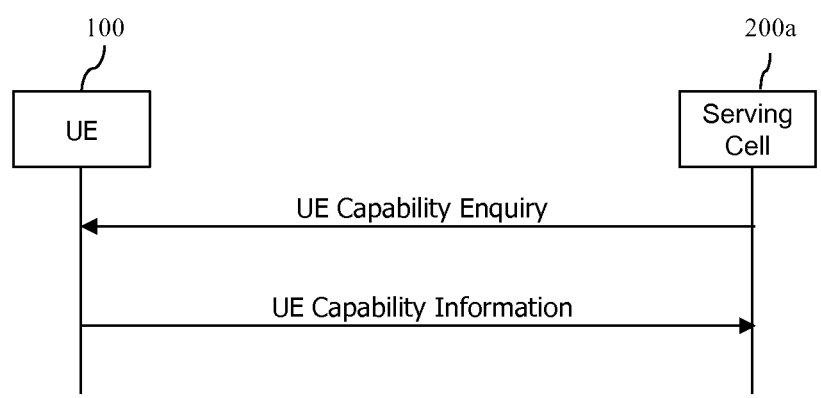
FIG. 10 illustrates a capability exchange procedure.

FIG. 10 Illustrates a Capability Exchange Procedure.

The illustrated procedure is a procedure for providing capability information regarding a radio access of a UE 100 to a serving cell 200*a*.

As illustrated, if there is a change in a radio access capability of the UE 100, the UE 100 may request a higher layer to start a necessary procedure.

Meanwhile, the serving cell 200*a* enquires UE capability information optionally or according to an instruction of a higher layer.

The UE 100 provides UE capability information according to the request.

Figure 11:
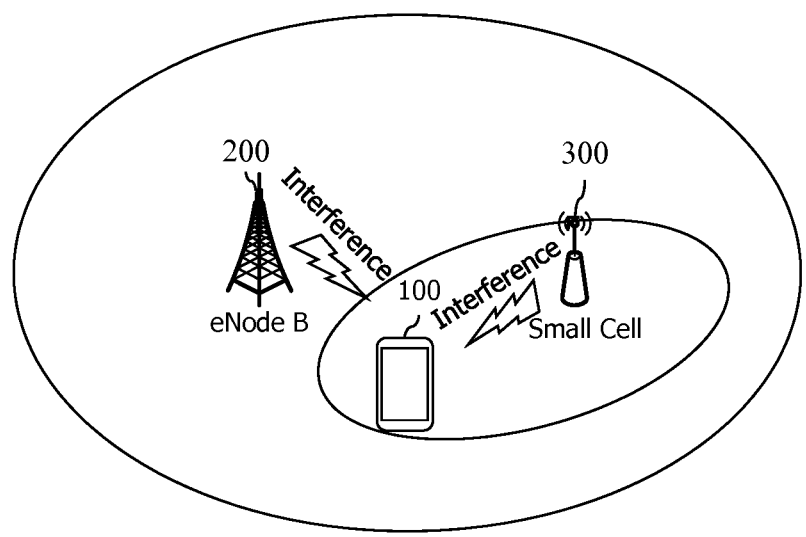
FIG. 11 illustrates a heterogeneous network including a macro cell and a small-scale cell.

FIG. 11 Illustrates a Heterogeneous Network Including a Macro Cell and a Small-Scale Cell.

A heterogeneous network in which a small-scale cell (e.g., a pico cell, a femto cell, or a micro cell) having lower-power transmit power exists in the existing macro cell coverage in an overlapping manner is under discussion in a next-generation communication standard including 3GPP LTE-A.

Referring to FIG. 11, the macro cell may overlap with one or more micro cells. A service of the macro cell is provided by a macro eNodeB (MeNB). In the present application, the macro cell and the MeNB may be used together. A UE having access to the macro cell may be referred to as a macro UE. The macro UE receives a downlink signal from the MeNB, and transmits an uplink signal to the MeNB.

The aforementioned small-scale cell is also referred to as a femto cell, a pico cell, or a macro cell. A service of the small-scale cell is provided by a pico eNodeB, a home eNodeB (HeNB), a relay node (RN), etc. For convenience, the pico eNodeB, the HeNB, and the RN are collectively referred to as the HeNB. In the present application, the macro cell and the HeNB may be used together.

The small-scale cell may be divided into an OA (open access) cell and a CSG (closed subscriber group) cell according to an accessibility. The OA cell implies a cell in which the UE can receive a service anytime when necessary without an additional access restriction. On the other hand, the CSG cell implies a cell in which only an authorized specific UE can receive a service.

The heterogeneous network has an inter-cell interference problem since the macro cell and the small-scale cell overlap. As illustrated, if the UE is located in a boundary of the macro cell and the small-scale cell, a downlink signal from the macro cell may act as an interference. Similarly, a downlink signal of the small-scale cell may also act as an interference.

For a more specific example, when the UE 100 connected to the small-scale cell 300 is located in a boundary of the small-scale cell, the connection with the small-scale cell 300 may be disconnected due to an interference from the macro cell 200. This implies that a coverage of the small-scale cell 300 is smaller than expected.

For another example, if the UE 100 connected to the macro cell 200 is located in an area of the small-scale cell 300, the connection with the macro cell 200 may be disconnected due to an interference from the small-scale cell 300. This implies that a shadow area exists in the macro cell 200.

In the most fundamental method for solving such an interference problem, different frequencies are used between cells. However, since a frequency is a rare and expensive resource, a method of solving the problem by using a frequency division is not much welcomed by a vendor.

Therefore, 3GPP intends to solve such an inter-cell interference problem through a time division.

Accordingly, an eICIC (enhanced inter-cell interference coordination) is actively under research recently as one of interference coordination methods in 3GPP.

The time division method introduced in LTE release-10 is called an enhanced ICIC (inter-cell interference coordination) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an ABS (almost blank subframe). No data is transmitted other than essential control information in a subframe corresponding to the ABS. For example, the essential control information is a CRS (cell-specific reference signal). In the current 3GPP LTE/LTE-A standard, the CRS signal exists only in OFDM symbols #0, #4, #7, and #11 in each subframe on a time axis. Accordingly, in the subframe to which the ABS is applied, only the CRS signal is transmitted on the OFDM symbols #0, #4, #7, and #11.

Figure 12:
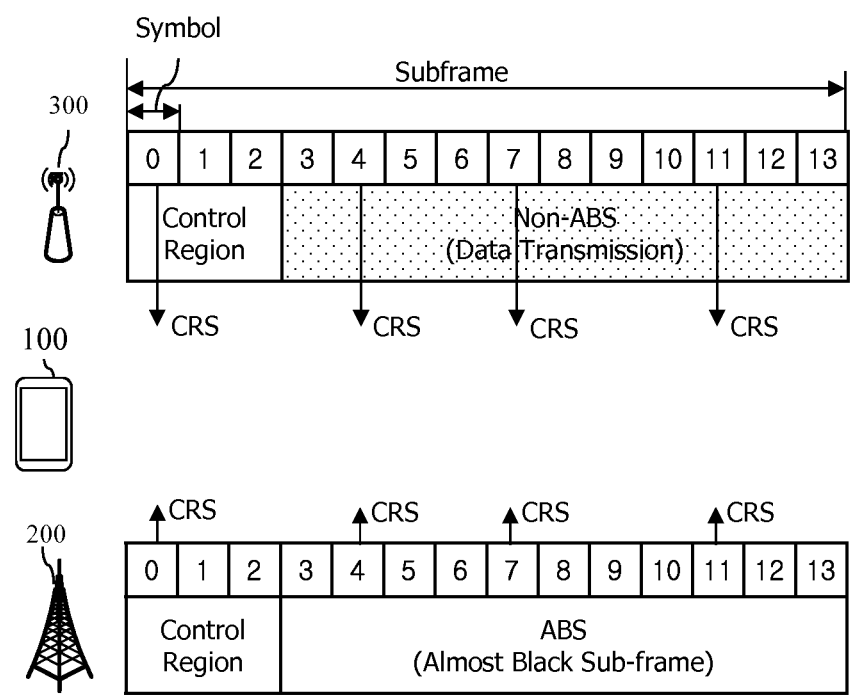
FIG. 12 illustrates an example of an eICIC (enhanced inter-cell interference coordination) for solving an interference between base stations (BSs).

FIG. 12 Illustrates an Example of an eICIC (Enhanced Inter-Cell Interference Coordination) for Solving an Interference Between BSs.

Referring to FIG. 12, a macro cell, i.e., the eNodeB 200, operates a subframe as an ABS.

The small-scale cell 300 corresponding to the aforementioned pico cell performs data transmission in a data region of the subframe. A CRS is transmitted on symbols #0, #4, #7, and #11.

On the other hand, when the eICIC is applied, the subframe is operated based on the ABS, and thus the macro cell, i.e., the eNodeB 200, may not transmit any data in the data region. However, only the CRS may be transmitted on the subframe which is operated based on the ABS.

As described above, in addition to solving an inter-cell interference problem by using the eICIC scheme, there may be a method of adding an interference cancellation function to the UE 100. Hereinafter, the method of adding the interference cancellation function is described.

Figure 13:
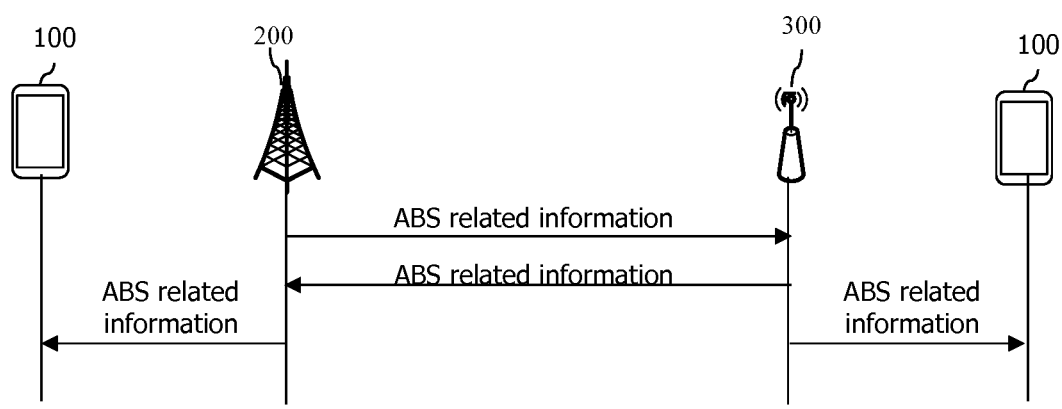
FIG. 13 illustrates an example of exchanging information related to an almost blank subframe (ABS) subframe.

FIG. 13 Illustrates an Example of Exchanging Information Related to an ABS Subframe.

As can be seen with reference to FIG. 13, ABS related information may be exchanged between a macro cell 200 and a small-scale cell 300 through an X2 interface.

In addition, each of the macro cell 200 and the small-scale cell 300 may deliver the ABS related information to its serving UE 100.

Each of the macro cell 200 and the small-scale cell 300 may configure a measurement subset for its serving UE 100 on the basis of one or more of its ABS related information and counterpart's ABS relation information, and thereafter may deliver it.

The corresponding cell 200/300 does not transmit a downlink signal on a downlink subframe which is set to the ABS, or transmits the downlink signal with decreased power. Therefore, a level of an interference having an effect within a coverage of another cell may be decreased in comparison with a downlink subframe which is not set to the ABS. Since the level of the interference may vary depending on whether the subframe is set to the ABS, the UE 100 must perform a measurement only on a predetermined specific subframe.

For this, on the basis of one or more of its ABS pattern information and counterpart's ABS pattern information, each of the cells 200/300 may instruct its serving UE 100 to perform a measurement only in a specific subframe. This is called a restricted measurement. The instruction may be delivered through a higher layer signal. The higher layer signal may be an RRC signal. The signal may be a CQI-ReportConfig element.

The ABS related information may include ABS information and an ABS status.

First, the ABS information may include one or more of information elements shown in the following table for example. The ABS pattern information is information which represents a subframe to be used as an ABS in a bitmap format. It may be configured with a bitmap of 40 bits in case of FDD and up to 70 bits in case of TDD. For example, in FDD, the 40 bits indicate 40 subframes, and if a bit value is 1, it indicates an ABS, and if the bit value is 0, it indicates a non-ABS subframe. A measurement subset is a subset of ABS pattern information, and is configured with a bitmap of 40 bits in the FDD case and up to 70 bits in the TDD case. Such a measurement subset is to configure a restricted measurement to a corresponding UE.

TABLE 5

| IE | Description |
| --- | --- |
| ABS Pattern Info | At each position of the bitmap, a value "1" indicates 'ABS', and a value "0" indicates 'non-ABS'. A first position of the ABS pattern corresponds to subframe 0 in a radio frame where SFN = 0. The ABS pattern is |

TABLE 5-continued

| IE | Description |
| --- | --- |
| | continuously repeated in all radio frames. The maximum number of subframes is 40. |
| Measurement Subset | It indicates a subset of the ABS Pattern Info, and is used to configure specific measurements for the UE. |
| ABS Inactive | It indicates that interference coordination by means of ABS is not active. |

Next, the ABS status is used to allow a corresponding cell to determine whether to change an ABS pattern. Usable ABS pattern information is a subset of ABS pattern information, and also consists of a bitmap. The Usable ABS pattern information indicates whether a subframe designated as an ABS is properly used for a purpose of an interference mitigation. The downlink ABS status is a ratio of the number of downlink resource blocks (RBs) scheduled in a subframe indicated in the usable ABS pattern information and RBs allocated for a UE which must be protected using the ABS, and indicates how effectively the ABS is utilized in a victim cell according to an original purpose.

TABLE 6

| IE | Description |
| --- | --- |
| DL ABS status | Percentage of used ABS resources. The numerator of the percentage consists of resource blocks within the ABS indicated in the Usable ABS Pattern Info, and the denominator of the percentage is the total number of resource blocks within the ABS indicated in the Usable ABS Pattern Info. |
| Usable ABS Pattern Info | Each position in the bitmap represents a subframe. A value "1"indicates 'ABS' designated as being protected from inter-cell interference, and a value "0" is used for all other subframes. The pattern represented by the bitmap is a subset of, or the same as, the corresponding ABS Pattern Info. |

A measurement subset consisting of a subset of the ABS pattern information is a subframe used as an ABS. Other subframes may autonomously determine whether a corresponding cell is utilized as an ABS according to a traffic load.

Figure 14:
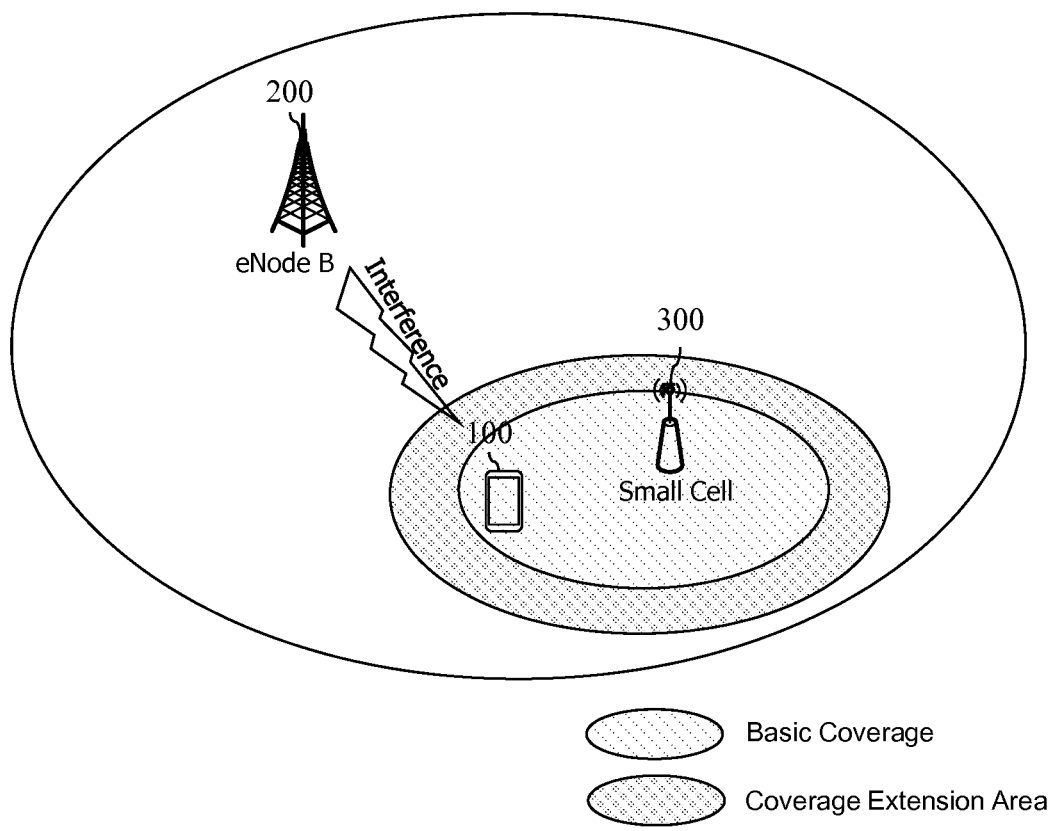
FIG. 14 illustrates the concept of coverage expansion of a small-scale cell according to one aspect of the present application.

FIG. 14 Illustrates the Concept of Coverage Expansion of a Small-Scale Cell According to One Aspect of the Present Application.

Referring to FIG. 14, a BS (e.g., pico eNodeB) 300 of several small-scale cells may be installed within a coverage of a BS (e.g., eNodeB) 200 of a macro cell. Further, if a UE 100 which receives a service from the BS 200 of the macro cell exists within the coverage of the BS 300 of the small-scale cell, a handover to the BS 300 of the small-scale cell is allowed, thereby being able to have an effect of offloading traffic of the BS 200 of the macro cell.

Herein, a handover from the BS 200 of the macro cell corresponding to a serving BS to the BS 300 of the small-scale cell corresponding to a target BS is achieved when strength of a reference signal of the target signal is greater than or equal to a specific threshold with respect to strength (RSRP, RSRQ) of a reference signal received by the UE 100 from the serving BS.

Meanwhile, by additionally using any means or by improving the capability of the UE 100, the handover to the target BS may be achieved even if the received reference signal strength of the target BS is not higher than the received reference signal strength of the serving BS by the threshold. Such an operation eventually leads to an effect of expanding a cell range or a cell radius of the BS (e.g., the pico eNodeB) 300 of the small-scale cell corresponding to the target BS. In the figure, a coverage expansion area wider than a basic coverage of the small-scale cell 300 is indicated by a slashed area. Such a coverage expansion area may be called a CRE (cell range expansion).

Herein, if a threshold used in a typical handover is expressed by $S_{th\_conv}$, an area in which CRE is possible may be expressed as an area which satisfies $S_{th\_conv} <= S_{received} <= S_{th\_CRE}$.

Meanwhile, reception strength for the reference signal from the small-scale cell 300 may be expressed as RSRP/RSRQ measured by the UE 100.

Figure 15:
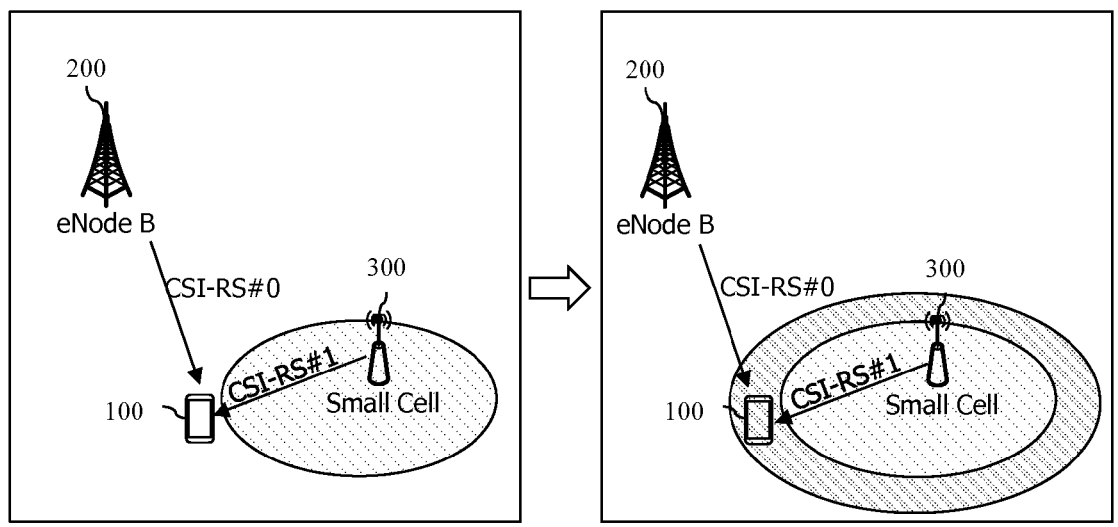
FIG. 15 illustrates an example of expanding a coverage of a small-scale cell when a macro cell and a small-scale cell which co-exist in the same area perform coordinated communication.

FIG. 15 Illustrates an Example of Expanding a Coverage of a Small-Scale Cell when a Macro Cell and a Small-Scale Cell which Co-Exist in the Same Area Perform Coordinated Communication.

As can be seen with reference to FIG. 15, it is shown a situation where a macro cell 200 and a small-scale cell 300 which co-exist in the same area transmit a CRI-RS in a coordinated manner.

In this case, a result obtained when the macro cell 200 operates any subframe not as an ABS but as a normal subframe is shown in a left figure, and a result obtained when the macro cell 200 operates a specific subframe as an ASB is shown in a right figure.

As can be seen by comparing the left figure and the right figure, since an interference caused by the macro cell 200 is decreased in size on a specific subframe operated as the ABS, channel quality between the UE 100 and the small-scale cell 300 is improved. As a result, a coverage of the small-scale cell 300 can be expanded.

Meanwhile, since only specific subframes based on a certain pattern are operated as an ABS instead of operating every subframe as an ABS by the macro cell 200, the channel quality between the UE 100 and the small-scale cell 300 varies for each subframe.

As a result, in order to accurately know the channel quality, it is necessary to know both of channel quality on the ABS subframe and channel quality on the normal subframe other than the ABS subframe.

Therefore, the cell 200/300 may instruct its serving UE 100 to perform a measurement on a set consisting of specific subframes through a restricted measurement. In order to instruct the restricted measurement, the cell 200/300 may notify a set consisting of a plurality of subframes by using a higher layer signal. Then, the UE 100 may perform a channel measurement on the subframes and may report a result thereof.

If the restricted measurement is configured, a set consisting of two types of different subframes is allocated to the UE 100, and a CSI measurement and reporting operation is performed for each subframe. This is because there is a problem in which a CSI is not accurately calculated when measurement results for two subframes are averaged due to a difference between an interference environment for each subframe and a channel environment. Therefore, it is necessary to define respective CSI measurement/report sets for subframes having two types of different interference environments. For this, the cell may report a location of each CSI-RS to the UE through signaling. That is, the cell may signal information of the CSI-RS to the UE 100. Further, the cell may signal information indicating which subframe is used when the UE 100 performs a measurement on the CSI-RS. Alternatively, the cell 200/300 may signal information regarding all CSI-RSs to be measured by the UE 100 irrespective of a set of the subframes, and may indicate a CSI-RS to be measured by the UE 100 in order to receive a CSI report for a specific subframe set.

Meanwhile, since channel quality between the UE 100 and the cell depends on an interference as described above, in order to know a correct CSI, it may be important for the cell to allow the UE 100 to perform an interference measurement and thereafter perform an IMR (interference measurement report).

Figure 16:
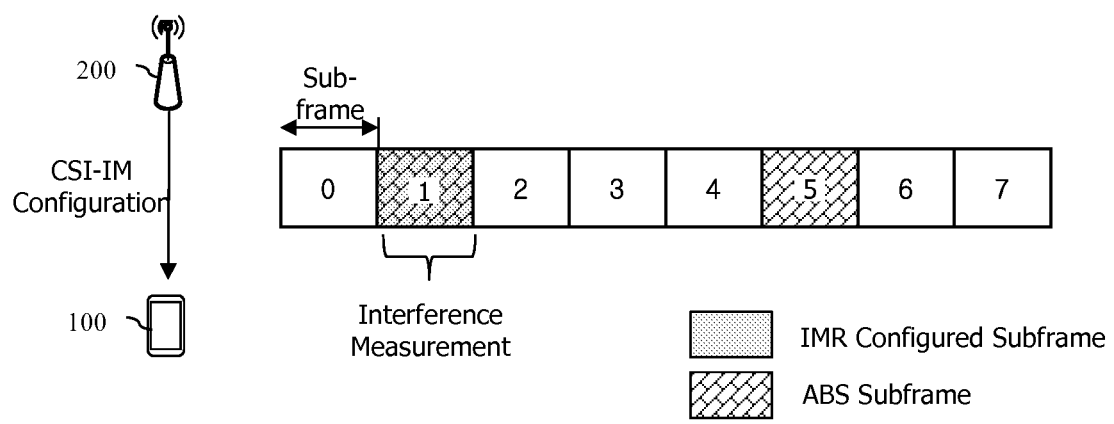
FIG. 16 illustrates an example of a subframe in which an interference measurement report (IMR) is configured for an interference measurement.

FIG. 16 Illustrates an Example of a Subframe in which an IMR is Configured for an Interference Measurement.

As can be seen with reference to FIG. 16, a small-scale cell 300 transmits to a UE 100 a configuration on an IM (interference measurement), for example, a CSI-IM configuration. The CSI-IM configuration may be transmitted through a higher layer signal, for example, an RRC signal.

The RRC signal may be a CSI-IM-Config information element, and may include one or more fields shown in Table 7 below.

TABLE 7

| Description on CSI-IM-Config field |
| --- |
| CSI-IM-ConfigId indicating an identifier of a CSI-IM configuration resourceConfig indicating a CSI-RS configuration subframeConfig indicating a configuration on a subframe in which an interference measurement is performed |

Referring to a subframeConfig parameter of Table 7 above, an IM (interference measurement) is configured in unit of a subframe. In this case, the subframe in which the IM is performed is configured equally to CSI-RS-SubframeConfig ($I_{CSI-RS}$) shown in Table 4. That is, the subframe in which the IM is performed is equal to a subframe in which a CSI-RS is transmitted.

In FIG. 16, it is exemplified that the subframe in which the IM is performed is a subframe 1. In this case, it is illustrated that the subframes 1 and 5 are configured as an ABS by the macro cell 200.

As such, the UE 100 may measure an interference caused by other neighboring cells in an ABS and a downlink subframe 1 in which the IM is configured, and this may be used to calculate channel quality. However, if the IM is not configured as in the downlink subframe 5 configured not as an ABS subframe but as a normal subframe, there is a problem in that the interference caused by other neighboring cells cannot be measured in the normal subframe, and as a result, channel quality cannot be calculated.

However, in order to accurately know the channel quality, it is necessary to know both of channel quality on the ABS subframe and channel quality on the normal subframe other than the ABS subframe.

In conclusion, since the ABS and the IMR are not always configured on the same subframe, there is a need for a method capable of measuring an interference from other neighboring cells for both of a normal subframe and an ABS subframe.

In order to solve such a problem, one aspect of the present application provides a method in which an interference measurement (IM) is configured not in unit of a subframe but in unit of a specific resource element (RE), and an average interference value during X[ms] is calculated to be used to calculate channel equality for both of a normal subframe and an ABS subframe.

Then, the UE 100 may measure a signal by using a CSI-RS, and may measure an interference in a specific RE by nullifying the RE. By measuring the interference in this manner, a CQI can be calculated more accurately.

Figure 17:
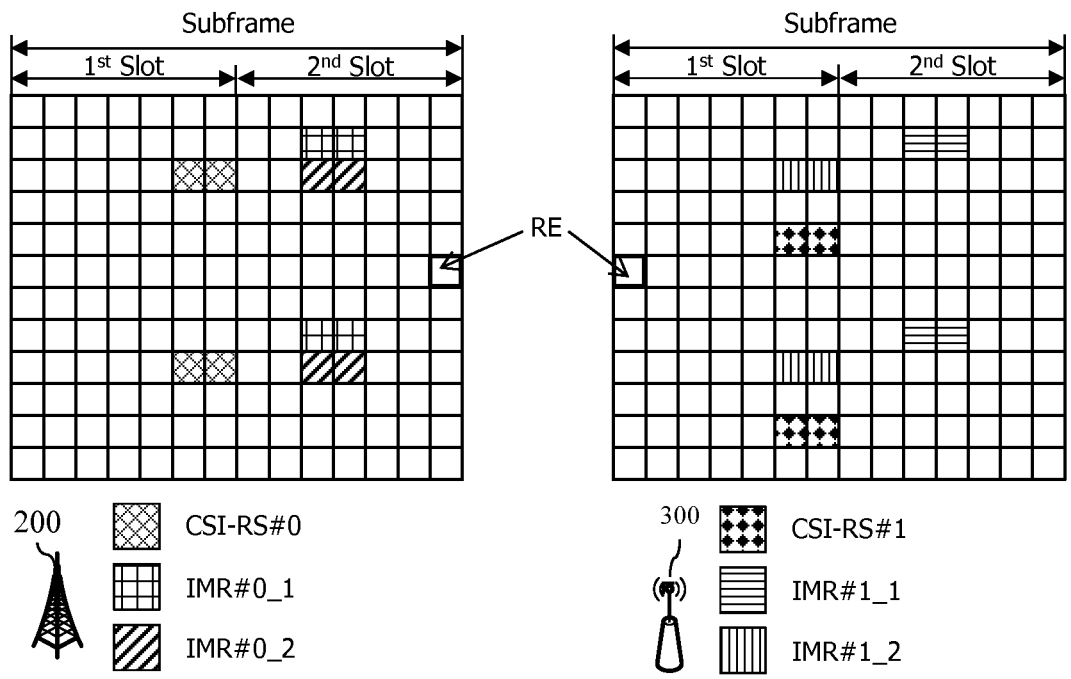
FIG. 17 illustrates an example of a configuration of an IM (interference measurement) according to one aspect of the present application.

FIG. 17 Illustrates an Example of a Configuration of an IM (Interference Measurement) According to One Aspect of the Present Application.

According to one aspect of the present application shown in FIG. 17, an IM is configured in unit of an RE.

Referring to FIG. 17, a subframe illustrated to the left is a downlink subframe based on a macro cell 200, and a subframe illustrated to the right is a downlink subframe based on a small-scale cell 300.

As can be seen with reference to FIG. 17, if it is assumed that the macro cell 200 transmits CSI-RS#0 and the small-scale cell 300 transmits CSI-RS#1, then the CSI-RS#0 and the CSI-RS#1 may have different RE locations on a subframe.

In such a situation, according to one aspect of the present application, the macro cell 200 may provide at least two IM configurations (e.g., IMR#0_1 and IMR#0_2) to a UE 100. Further, the small-scale cell 300 may provide at least two IM configurations (e.g., IMR#1_1 and IMR#2_2) to the UE 100.

The IMR#0_1 and the IMR#1_1 are configured in the same location on a subframe, and are for measuring an interference from other neighboring cells besides the macro cell 200 and the small-scale cell 200.

Meanwhile, the IMR#0_2 and the IMR#1_2 may be configured on different RE locations. In this case, the IMR#1_2 overlaps with an RE location of CSI-RS#0 of the macro cell 200, and is for measuring an interference caused by the CSI-RS#0 from the macro cell 200.

Then, the UE 100 measures an interference $I_1$ from other neighboring cells besides the macro cell 200 and the small-scale cell 300 by using a first combination of IMR#0_1 and IMR#1_1. Further, the UE 100 measures an interference $I_2$ from the macro cell 200 and other neighboring cells by using a second combination of IMR#0_2 and IMR#1_2.

If an ABS and an IM are not configured on the same subframe in an environment where a restricted measurement is required as described above, the UE 100 uses the measured interference $I_1$ in ABS CQI measurement/reporting by averaging it during X[ms], and may use the measured interference $I_2$ in CQI measurement/reporting for a normal subframe by averaging it during X[ms].

Figure 18:
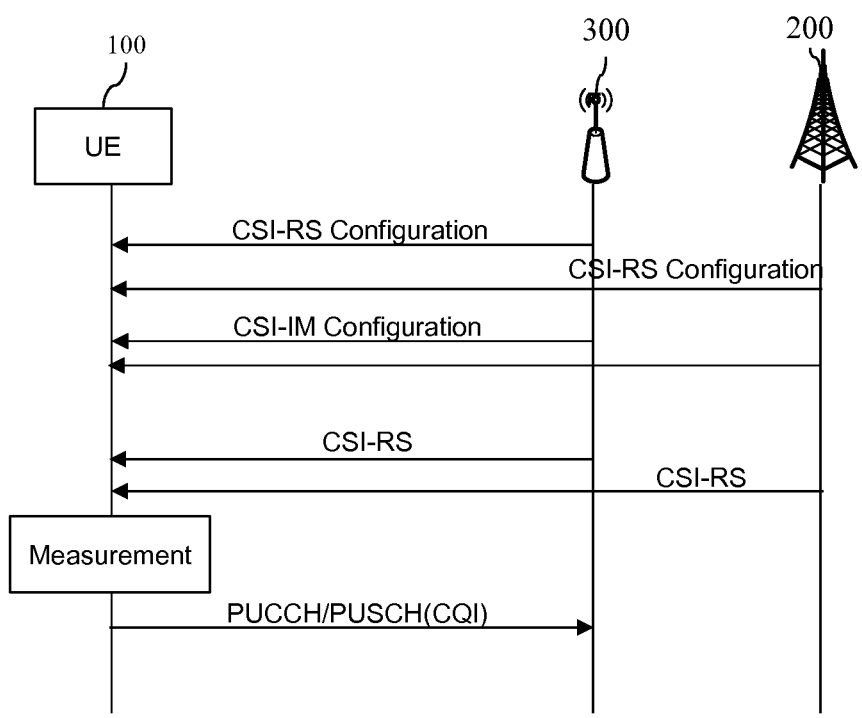
FIG. 18 illustrates an example of a signal flow according to one aspect of the present application.

FIG. 18 Illustrates an Example of a Signal Flow According to One Aspect of the Present Application.

As can be seen with reference to FIG. 18, each of a macro cell 200 and a small-scale cell 300 delivers a CSI-RS configuration and a CSI-IM configuration to a UE 100.

According to one aspect of the present application, the CSI-IM configuration may include an indication for allowing an IM to be performed in unit of an RE. Then, each CSI-IM configuration may include at least two configurations.

Then, the UE 100 measures each interference by using each CSI-IM configuration. Subsequently, the UE 100 may use an interference value measured by using the aforementioned first combination in CQI measurement/reporting for an ABS subframe, and may use an interference value measured by using the aforementioned second combination in CQI measurement/reporting for a normal subframe.

The exemplary embodiments of the present invention which has been described up to now may be implemented through various means. For example, the exemplary embodiments of the present invention may be implemented by hardware, firmware, software, or combinations thereof.

Figure 19:
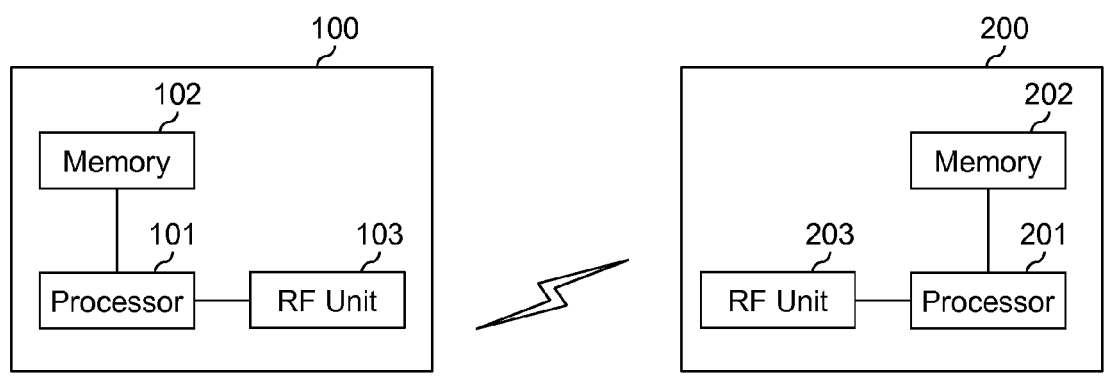
FIG. 19 is a block diagram illustrating a wireless communication system where an embodiment of the present invention is implemented.

FIG. 19 is a Block Diagram Illustrating a Wireless Communication System Where an Embodiment of the Present Invention is Implemented.

The base station for macro cell or small cell 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 such as UE includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

INDUSTRIAL APPLICABILITY

The present invention may be used for a terminal, a base station or other equipment of wireless mobile communication systems.

What is claimed is:

1. A method for measuring an interference in a wireless communication system in which a macro cell and a small-scale cell co-exist, the method performed by a teiininal and comprising:

receiving, by the terminal, configuration information regarding an interference measurement (IM), wherein the configuration information regarding the IM contains at least two configurations, each configuration is defined in unit of a resource element (RE), a first configuration of the two configurations is for measuring an interference from other neighboring cells besides the macro cell and the small-scale cell, and a second configuration is for measuring an interference from the macro cell;

measuring the interference by using the configuration information regarding the IM; and feeding back channel quality attained by using the measured interference value, wherein the second configuration is defined such that an RE for the IM is overlapped with an RE of a channel state information reference signal (CSI-RS) of the macro cell.

2. The method of claim 1, wherein the first configuration is defined such that an RE for the IM is not overlapped with an RE of a channel state information reference signal (CSI-RS) of the macro cell and the small-scale cell.

3. The method of claim 1, wherein the first configuration is for attaining the same result as the IM performed on a subframe operated as an almost blank subframe (ABS), and the second configuration is for attaining the same result as the IM performed on a normal subframe not operated as the ABS.

4. The method of claim 1, wherein the receiving of the configuration information comprises:
   receiving first configuration information regarding the IM from the macro cell; and
   receiving second configuration information regarding the IM from the small-scale cell.

5. The method of claim 4,
   wherein the first configuration in the first configuration information from the macro cell and the first configuration in the second configuration information from the small-scale cell overlap with each other in terms of the RE, and
   wherein the second configuration in the first configuration information from the macro cell and the second configuration in the second configuration information from the small-scale cell are different from each other in terms of the RE.

6. A terminal for measuring an interference by a terminal in a wireless communication system in which a macro cell and a small-scale cell co-exist, the terminal comprising:
   a radio frequency (RF) unit configured to receive, by the terminal, configuration information regarding an interference measurement (IM), wherein the configuration information regarding the IM contains at least two configurations, each configuration is defined in unit of a resource element (RE), a first configuration of the two configurations is for measuring an interference from other neighboring cells besides the macro cell and the small-scale cell, and a second configuration is for measuring an interference from the macro cell; and
   a processor configured to measure the interference by using the configuration information regarding the IM, and for feeding back channel quality attained by using the measured interference value,
   wherein the second configuration is defined such that an RE for the IM is overlapped with an RE of a channel state information reference signal (CSI-RS) of the macro cell.

7. The terminal of claim 6, wherein the first configuration is defined such that an RE for the IM is not overlapped with an RE of a channel state information reference signal (CSI-RS) of the macro cell and the small-scale cell.

8. The terminal of claim 6, wherein the first configuration is for attaining the same result as the IM performed on a subframe operated as an almost blank subframe (ABS), and the second configuration is for attaining the same result as the IM performed on a normal subframe not operated as the ABS.

9. The terminal of claim 6, wherein the configuration information for the IM contains first configuration information received from the macro cell and second configuration information received from the small-scale cell.

* * * * *